Nov. 17, 1942.　　B. P. GRAVES ET AL　　2,302,026
MACHINE TOOL
Original Filed Oct. 7, 1939　　5 Sheets-Sheet 2

Witness
Charles J. Olson

Inventors
Benjamin P. Graves
Hans Carl Weimer
by Fred Hildreth
Cary & Jenney Attys

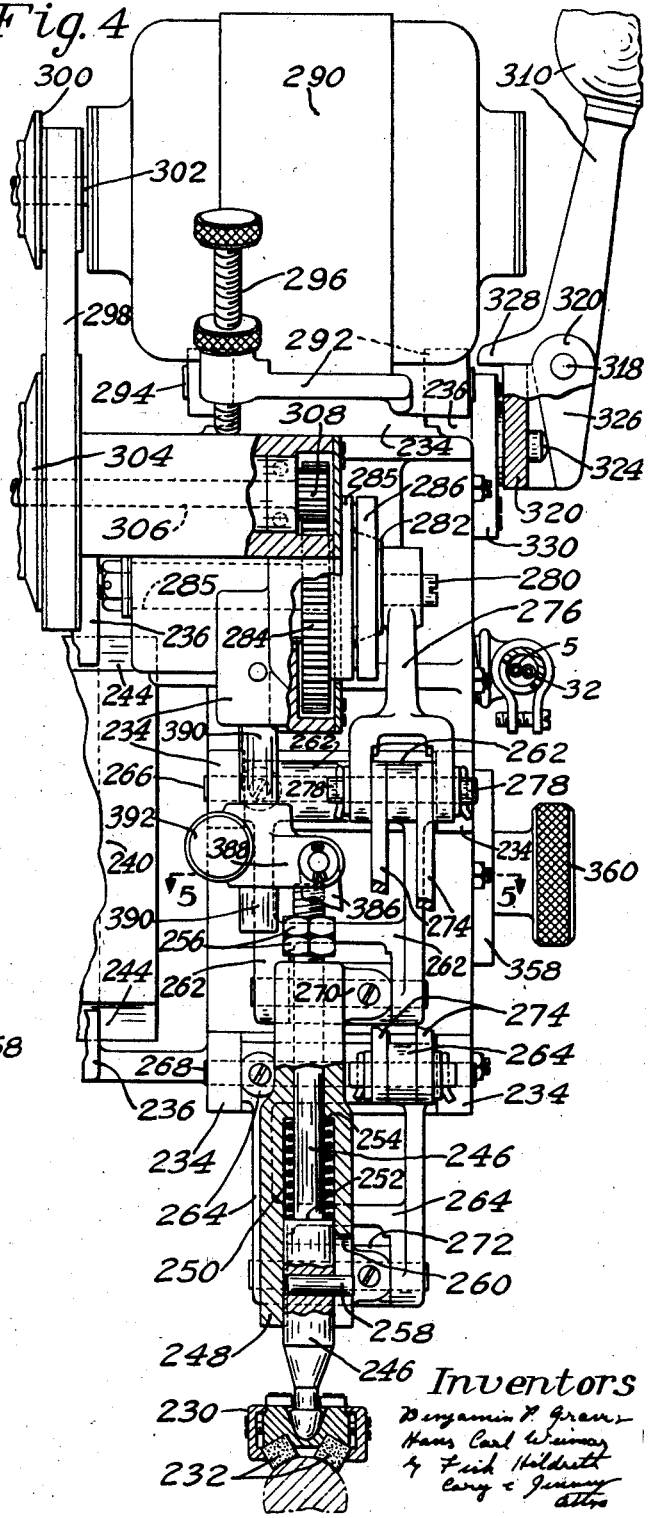
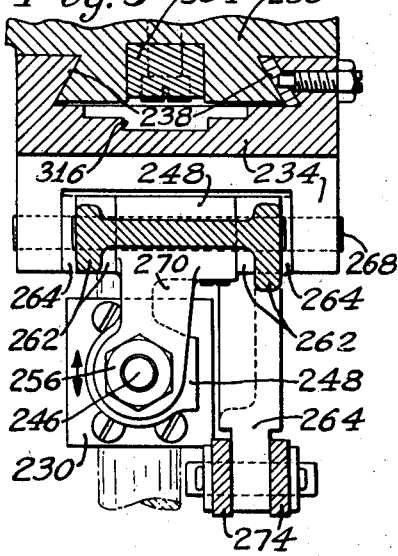

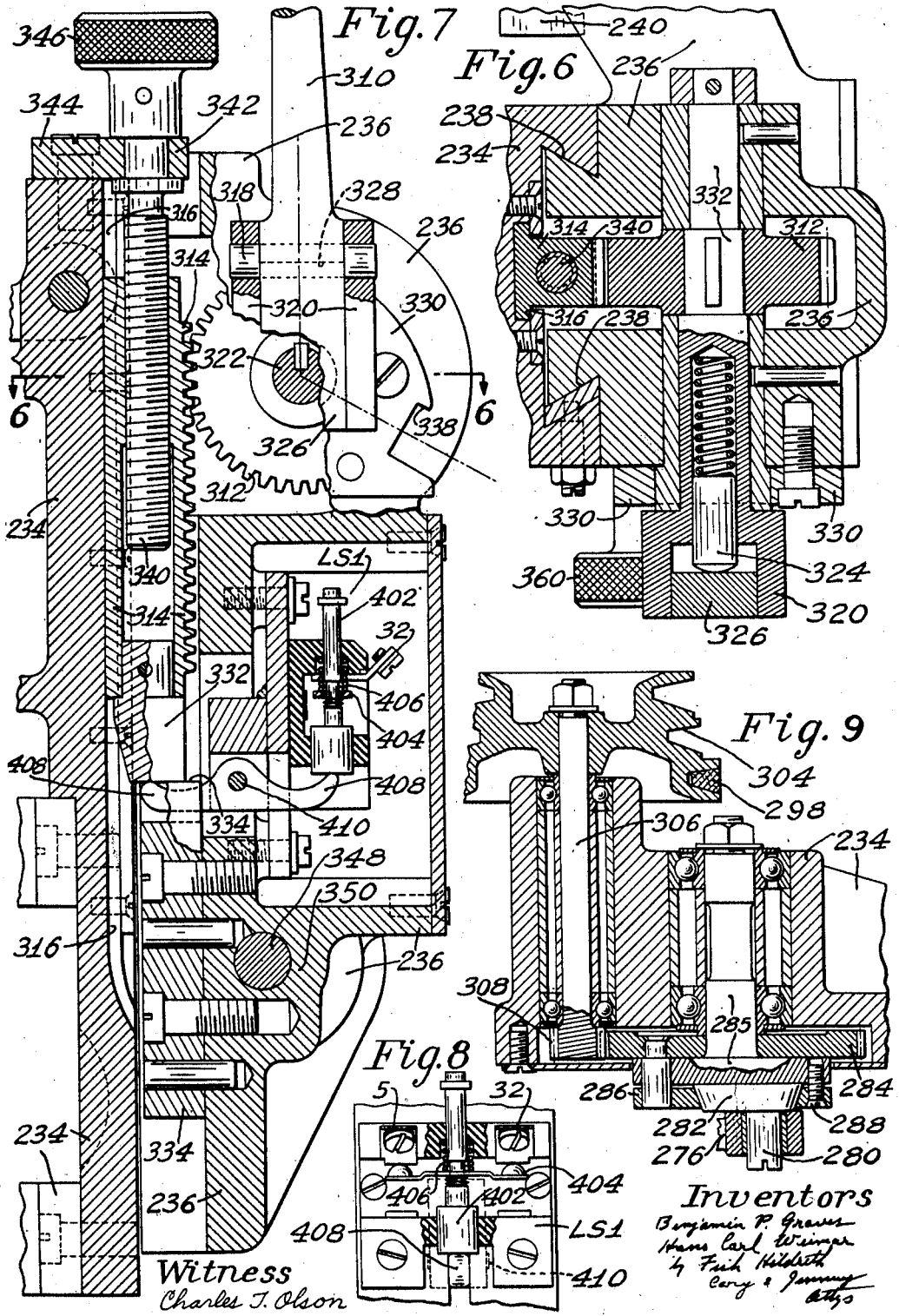

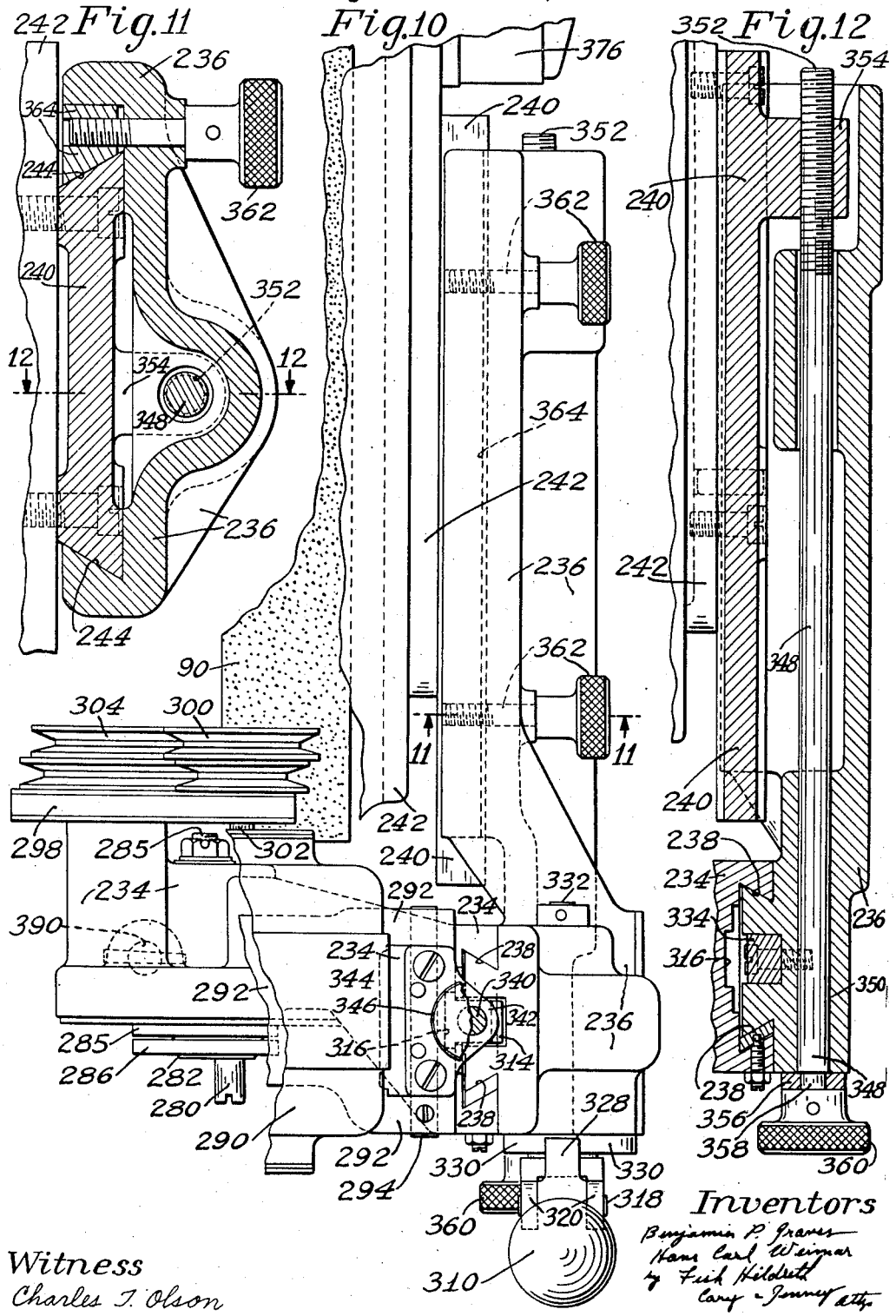

Patented Nov. 17, 1942

2,302,026

UNITED STATES PATENT OFFICE 2,302,026

MACHINE TOOL

Benjamin P. Graves, Barrington, and Hans Carl Weimar, Providence, R. I., assignors to Brown and Sharpe Manufacturing Company, a corporation of Rhode Island Original application October 7, 1939, Serial No. 298,460. Divided and this application July 5, 1941, Serial No. 401,190

9 Claims. (Cl. 51—64)

The present invention relates to a honing attachment adapted for use in a machine tool of the general type having relatively movable tool and work supports.

Applicants' honing attachment forming the subject-matter of the present invention is herein disclosed in a preferred form as applied to a cylindrical grinding machine comprising a work support having a rotary work holder mounted thereon, a grinding wheel spindle, and a carriage support for the spindle, together with operating means for imparting relative translatory and cross feeding or positioning movements to said supports.

It is the object of the present invention to provide a novel and improved honing attachment which is rugged and simple in construction, and is well adapted for the efficient performance of a secondary honing or finishing operation upon a work piece.

Figure 1:
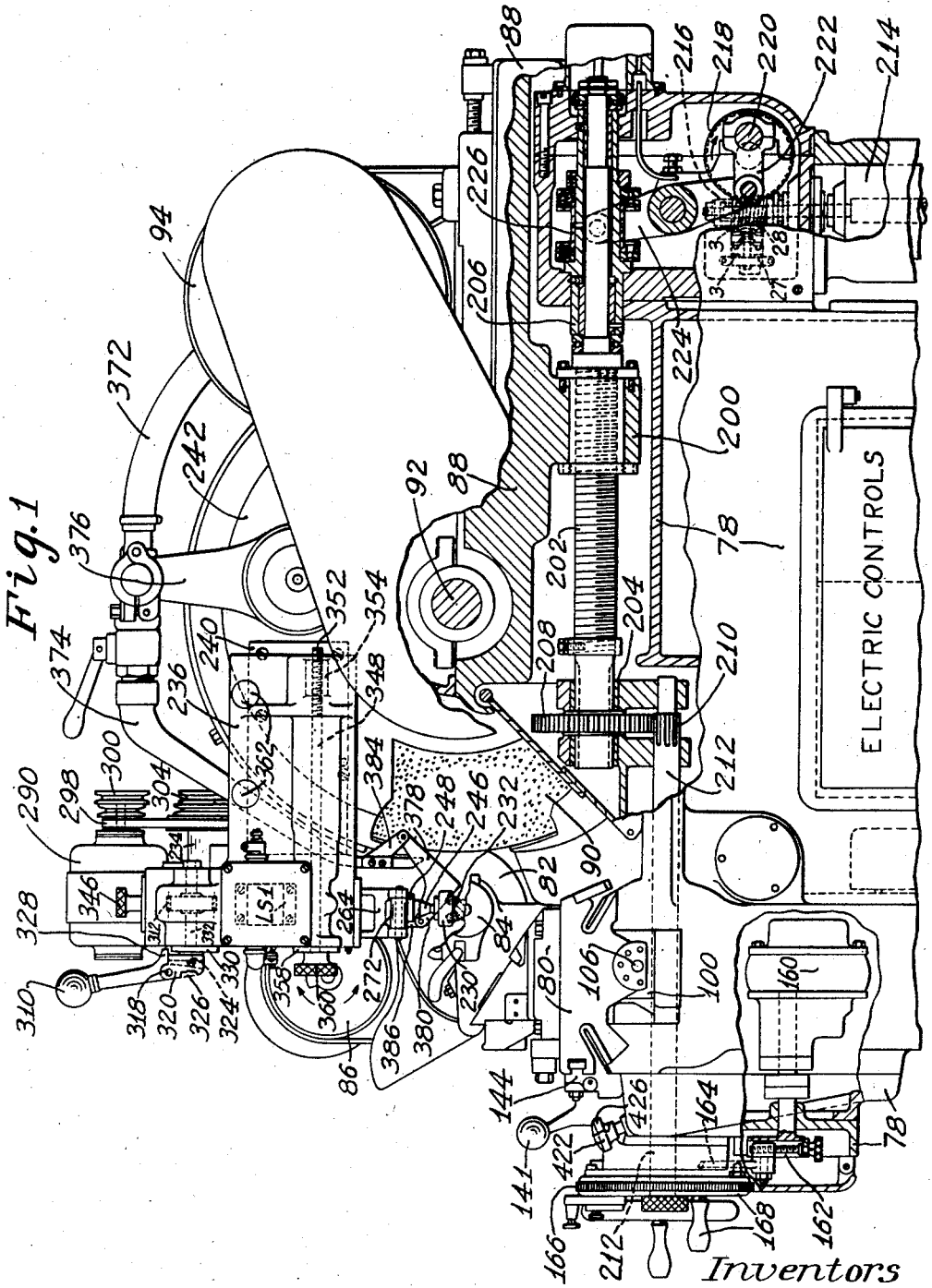
Figures 2, 3:
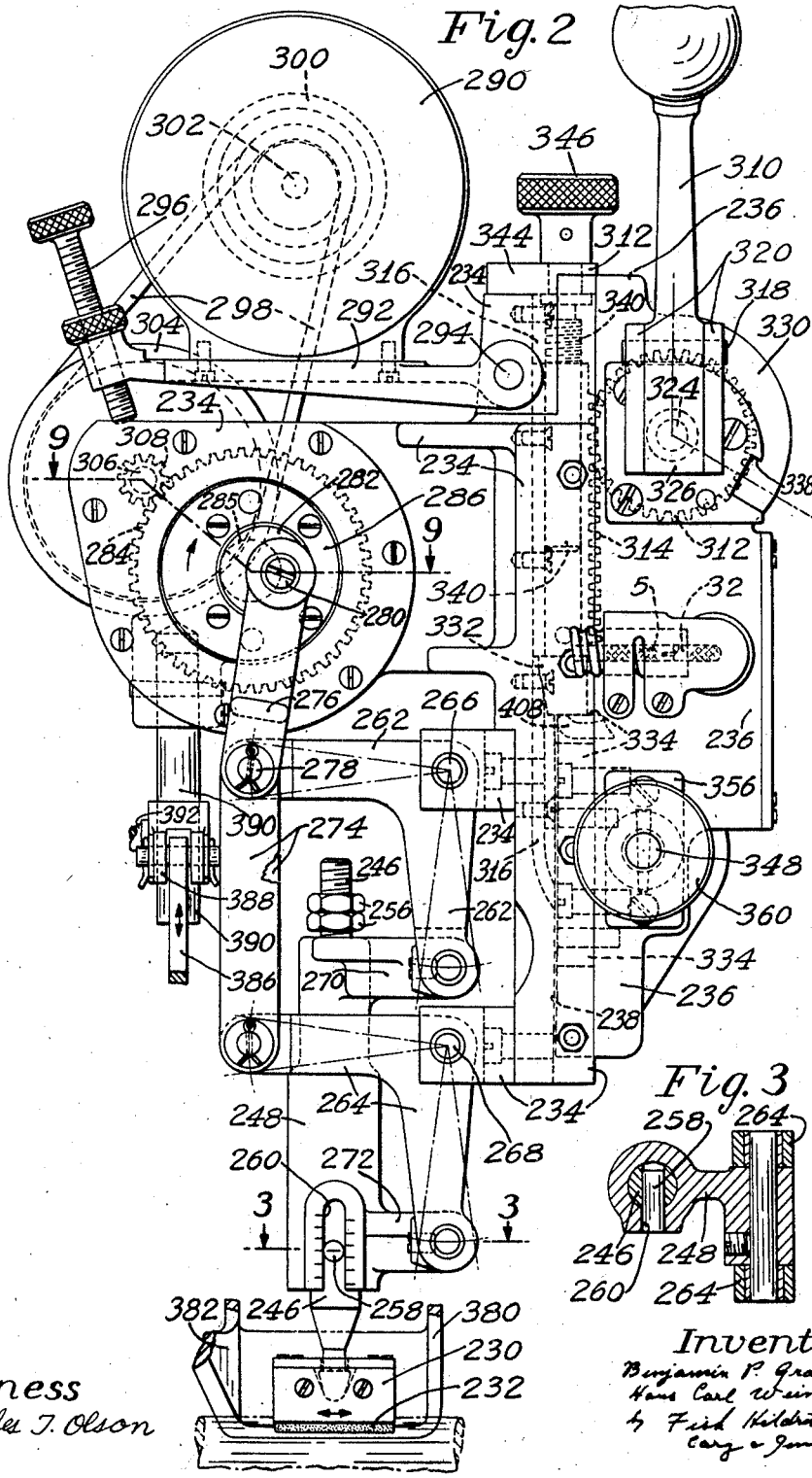

With these and other objects in view as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawings, in which Fig. 1 is a view in right side elevation of a cylindrical grinding machine having mounted thereon applicants' improved honing attachment; Fig. 2 is an enlarged detail view in front elevation of the honing attachment; Fig. 3 is a detail sectional plan view taken on the line 3—3 of Fig. 2; Fig. 4 is a detail view looking from the left showing substantially the parts of the honing attachment illustrated in Fig. 2; Fig. 5 is a detail sectional plan view taken on the line 5—5 of Fig. 4; Fig. 6 is a sectional plan view taken on the line 6—6 of Fig. 7; Fig. 7 is a detail sectional view in front elevation taken through the honing attachment, and illustrating particularly the mechanism for raising and for lowering the honing attachment into operating position, the mechanism for adjusting the limits of vertical movement of the honing attachment, and the operating switch connection for starting and stopping the honing motor; Fig. 8 is a detail view partly in section of the operating switch shown in Fig. 7; Fig. 9 is a detail sectional plan view taken on the line 9—9 of Fig. 2, illustrating a portion of the driving mechanism for reciprocating the honing device; Fig. 10 is an enlarged plan view of the honing attachment, with portions of the same broken away, and illustrating particularly the means for supporting the attachment on the grinding wheel guard plate; Fig. 11 is a detail sectional view in front elevation taken on the line 11—11 of Fig. 10; and Fig. 12 is a sectional plan view taken on the line 12—12 of Fig. 11.

The invention is herein disclosed as embodied in a cylindrical grinding machine having a base 78, a reciprocable work table 80, a rotary work holder comprising a headstock generally indicated at 82, a tailstock 84, a cross feed slide or carriage 88, a grinding wheel 90, a wheel spindle 92, and a spindle driving motor 94 supported on the cross feed slide 88. The machine is provided with means for effecting cross feeding movements of the wheel spindle carriage, these parts including the nut 200 and cross feed screw 202 being shown in Fig. 1, and is additionally provided with cross feed rapid movement mechanism for moving the grinding wheel carriage and grinding wheel rapidly through a predetermined distance toward and away from the work. This mechanism, as generally indicated in Fig. 1, includes a cross feed motor 214, a worm 216, a worm gear 218, a crank 220 driven thereby, a link 222, and an actuating lever 224 having a sleeve connection 226 with the cross feed screw 202 for effecting axial movement thereof bodily between forward and back limiting positions.

Inasmuch as the invention which forms the subject-matter of the present application is concerned particularly with the construction and arrangement of the honing attachment per se, further illustration and description of the cylindrical grinding machine to which it has been applied is herein omitted. Features of applicants' invention concerned with an improved control system for a machine of this general type which will adapt the machine for automatic operation in accordance with an added honing cycle of operation form the subject-matter of applicants' application for U. S. Letters Patent Serial No. 298,460, filed October 7, 1939, of which the present application is a division.

In carrying out the present invention, applicants have provided a honing attachment which is conveniently secured to the grinding wheel guard on the wheel spindle carriage, and comprises essentially a honing element having honing stones mounted therein arranged for engagement with one side of the work, and for rapid vibratory or reciprocatory movement axially of the work. In the illustrated form of the invention, the honing element and supporting and actuating mechanism therefor are mounted in a housing which is vertically movable between alternative lowered work engaging and raised inoperative positions. The holder is carried upon the lower end of a spring-seated spindle which is in turn supported upon a pair of parallel levers carried by the housing. The levers are connected through linkage connections to a motor driven crank which serves to impart a rapid vibratory movement to the parallel levers, the spindle supported thereby, and the honing element axially of the work.

Further in accordance with the invention, applicants' honing attachment is mounted on the cross feed slide and in such relation to the several operating parts of the machine as to provide an organization of the machine of maximum effectiveness for the performance of a honing operation, and which will not have the effect of obstructing or interfering with the usual operating functions of the machine. To this end the housing is supported for vertical movement on a horizontal slide member which is adjustably secured to guideways in a bracket on the wheel spindle guard. These parts are constructed and arranged so that the rapid movement of the wheel spindle carriage to its fully retracted position will cause the honing attachment including the holder to be located directly above the work in position to be lowered into work engaging contact. When the grinding wheel carriage is in its relatively advanced grinding position, the honing attachment will be located in a relatively advanced inoperative position in front of, and above the work on the machine.

In the illustrated construction, the mechanism for raising and lowering the housing and the vibratory honing device mounted thereon, comprises a hand lever movable between alternative fixed limiting positions, and having a rack and pinion operating connection with the housing. In order to provide for adjustment particularly of the low or work engaging position to which the honing device is moved by the movement of the hand lever as may be required by different diameters of work being operated upon, the rack is movably secured to the housing for vertical adjustment with relation thereto.

In accordance with the present invention, operating connections are provided which are rendered operative by the movement of the honing device to its work engaging position to start the honing device in active operation. In the illustrated construction, a switch is provided which is arranged to be closed by movement of the housing and the honing device supported thereon to the low work engaging position, and serves to start the vibratory movement of the honing attachment.

The honing attachment provided in accordance with the present invention, as generally shown in Figs. 1 and 2 of the drawings, comprises a vibratory honing element 230 including honing stones 232, a housing 234 on which the honing element and its supporting and actuating mechanism is carried, a support 236 including guideways 238 on which the housing is vertically movable, and a bracket 240 secured to the usual grinding wheel guard 242 of the machine having horizontal guideways 244 (see Fig. 11) in which the support 236 is adjustably secured.

Supporting and actuating connections for the honing element 230, as best shown in Figs. 2, 4 and 5, comprise a vertical spindle 246 having at its lower end a tapered pin and socket connection with the honing element 230 providing a tiltable connection therewith. The spindle 246 is slidably mounted in a spindle support 248, and is pressed yieldingly downwardly by means of a compression spring 250 coiled about a reduced shank portion of the spindle between a shoulder 252 on the spindle and a shoulder 254 in the spindle support 248. Downward movement of the spindle in its support is limited by adjustable check nuts 256 screw-threaded to the upper end thereof, and arranged to bear against the abutting upper end of the spindle support 248. As hereinafter more fully set forth, the housing 234 and the honing device supported therein including the spindle support 248 are moved downwardly to an adjustable work engaging position in which the honing element 230 will be engaged against the work, and in which the spindle 246 will be forced upwardly to some extent against the pressure of the spring 250 to provide a spring-pressed contact between the honing element and work. The spindle 246 is keyed against rotational movements in its support by means of a pin 258 on the spindle which engages within a slotted portion 260 of the spindle support 248. The parts above described including the honing element 230, spindle 246, and spindle support 248 are supported for vibratory movements bodily substantially in the line of the axis of rotation of the work holder and work by means of two bell-crank levers 262 and 264 having pivotal supports 266 and 268 respectively in the housing 234. As seen, for example, in Fig. 2, the levers 262, 264 are located directly above one another in parallel position, having the downwardly extending arms thereof pivotally connected to lugs 270 and 272 formed on the spindle support 248. Links 274 connecting the laterally extending arms of the bell-cranks, cause these levers to move as a single unit.

A rapid oscillatory movement is imparted to the honing element 230 by means of a motor driven crank and link connection with the bell-crank levers 262, 264. Referring specifically to Figs. 2, 4 and 9, these connections comprise a link 276 bifurcated at its lower end to straddle the horizontal arm of the bell-crank and links 274, and connected thereto by a pivot pin 278. At its upper end the link 276 is pivoted on an eccentric pin or crank 280 formed in a rotatably adjustable circular disk 282 which is in turn eccentrically supported on the face of a driving gear 284 carried on a rotatable shaft 285. As best shown in Fig. 9, the eccentric disk 282 has a tapered peripheral edge which engages with a correspondingly tapered aperture in a clamping plate 286 which is carried on one face of the driving gear 284, and is rigidly clamped thereto by machine screws 288. With this construction it will be seen that the length of the crank arm provided by the eccentricity of the pin 280 with relation to the driving gear 284 may be readily adjusted to vary the amplification of the vibratory movements imparted to the honing element 230 by adjusting the angular position of the eccentric disk 282 with relation to the driving gear 284.

The driving gear 284 and crank pin 280 supported thereon are driven from an electric motor 290 supported on a bed plate 292 hinged at 294 to the upper face of the housing 234. An adjusting screw 296 formed on the outer edge of the bed plate 292 for engagement with the housing 234 provides convenient means for adjusting the tension on a driving belt 298 passing over a stepped pulley 300 on the armature shaft 302 of the motor, and over a stepped pulley 304 carried on a driven shaft 306 in the housing 234. A pinion 308 formed on the shaft 306 meshes with and serves to drive the gear 284 and crank pin 280.

The housing 234 and the honing device supported thereon are arranged to be moved through a predetermined distance between low work engaging and high inoperative positions through the operation of a manually operable control lever 310 and a pinion 312 carried on the support 236 for engagement with a rack 314 adjustably supported in a T-shaped slot 316 formed in the housing 234. The lever 310, as best shown in Figs. 2, 6 and 7, is pivotally supported for forward and back movements on a pivot pin 318 within a bifurcated bracket 320 formed on one end of a rock shaft 322 to which is also secured the pinion 312. A spring-pressed plunger 324 mounted in an axial recess in the shaft 322 abuts against a downwardly extending tail 326 of the lever 310 acting to maintain the lever 310 in an upright position in which a rearwardly extending abutment 328 thereof will engage against the peripheral edge of a latch plate 330. The control lever 310 is arranged to be moved through 120° between work engaging and inoperative positions. In the position shown, for example, in Figs. 2 and 7, with the lever in its raised or vertical position, the housing 234 and honing device supported thereon, will have been lowered to its low work engaging position, the extent of this downward movement being determined by the engagement of a block 332 secured to the lower end of the rack 314 with a stop surface 334 on the housing support 236. In order to raise the housing 234 and honing device to their inoperative position, the lever is moved downwardly through 120° to a limiting position determined by the engagement of the abutment 328 on the lever with one side of a recess 336 in the latch plate 330. The lever is now permitted to rock rearwardly about its pivot 318, causing the abutment 328 to move into latching position in the recess 336, thus locking the honing device in its raised inoperative position.

In accordance with one feature of the invention, an adjustment is provided for adjusting the downward limit of movement of the honing device to its work engaging position as determined by the throw of the control lever 310 and the seating of the rack 314 and block 332 against the stop surface 334. This adjustment is provided by means of an adjusting screw 340 screw-threaded into the upper end of the rack 314, and having a bearing 342 in a supporting plate 344 which is secured to the housing 234 and overlies the upper end of the T-shaped slot 316 for the rack. A knurled head 346 secured to the upper end of the adjusting screw 340 provides a convenient means for effecting this adjustment in the position of the rack 314 relative to the housing 234.

As best shown in Figs. 10 to 12 inclusive, the support 236 for the housing 234 is slidably supported on the bracket 240 on the wheel guard to permit adjustment of the honing attachment forwardly or rearwardly on the wheel spindle carriage 88, so that the honing device will be accurately placed above the axis of rotation of the work holder and work when the wheel slide rapid movement is rendered operative to retract the grinding wheel carriage 88 from grinding position to its fully retracted position away from the work. The mechanism for effecting this adjustment comprises a rearwardly extending rod 348 which is rotatably supported in a bearing 350 in the support 236 for the housing, and is provided at its rear end with a screw thread 352 engaging with a nut formed in a lug 354 on the bracket 244. The rod 348 is supported against axial movement with relation to the support 236 by means of a collar 356 which engages with the reduced forward end portion 358 of the rod 348 between the shouldered end of the reduced portion and a knurled operating knob 360 secured thereto. The support 236 is rigidly clamped in adjusted position by means of two clamping screws 362 rotatably mounted in the support 236, and having screw-threaded engagement with a clamping shim 364 contacting with the guideway 244.

In accordance with the present invention, an operating switch is provided which is arranged to be closed by movement of the housing and honing device supported thereon to the low work engaging position to start the honing motor 290 in active operation. As best shown in Figs. 7 and 8 of the drawings, the honing switch generally designated at LS1 comprises an axially movable plunger 402 having mounted on the reduced portion thereof a switch contact cross arm 404 arranged to contact with connections 5—32. A compression spring 406 tends normally to maintain the plunger and switch arm in a low open position. The actuating connections for the switch comprise a switch lever 408 pivoted at 410 on the support 236 for the housing 234. One end of the switch lever 408 is arranged to engage beneath the switch plunger 402, and the other end enters a slotted portion of the abutment 334 for limiting the downward movement of the rack 314 and housing 234. Downward movement of the rack to its limiting position against the abutment 334 acts to rock the switch lever 408 in a counter-clockwise direction as illustrated in Figs. 7 and 8, to close the switch and thereby to start the honing motor 290.

The several features of applicants' honing attachment have been described, and the advantages thereof pointed out by way of illustration in connection with the use of the attachment in a cylindrical grinding machine. The several novel features of construction and operation of the attachment are believed however to be of broad scope, and to render the attachment readily applicable to other types of machine tools having relatively movable tool and work supports.

It will be understood that the invention is not limited to the specific embodiment shown, and that various deviations may be made therefrom without departing from the spirit and scope of the appended claims.

What is claimed is:

1. For use in a machine tool having a work support, and a tool support arranged for relative movement, a honing device which comprises a honing element, a spindle having a tiltable connection therewith, a spindle support, means for yieldably supporting the spindle in an extended position in its support, a pair of supporting levers on which said spindle support is mounted for movement substantially in the line of honing contact with the work, means for imparting a vibratory movement to said spindle and its support and honing element supported thereby comprising a prime mover, an eccentric driven thereby and connections from the eccentric for imparting parallel oscillatory movements to said levers, and a housing for said honing device mounted on the tool support movable between work engaging and withdrawn inoperative positions.

2. For use in a machine tool having a work support, a tool support, and means for effecting relative movement of said supports, a honing attachment arranged to be supported on the tool support comprising a honing element; a spindle to which the honing element is attached arranged substantially perpendicular to the work at the point of honing contact, a pair of bell-crank levers on which the spindle is carried having the pivotal axes and spindle supporting arms thereof arranged substantially in one line perpendicular to the work at the point of honing contact, and actuating means including a link connection between the free arms of said bellcranks for imparting simultaneous identical vibratory movements thereto.

3. For use in a machine tool having a work support, a tool support, and means for effecting relative movement of said supports in at least one plane, a honing attachment arranged to be supported on the tool support comprising a honing element, a honing element support including a spindle on which the honing element is carried arranged substantially perpendicular to the surface of the work at the point of honing contact and a yieldable connection engaging the honing element yieldably against the work, a pair of levers on which the honing element support is carried having their pivotal axes disposed with relation to one another in a line substantially perpendicular to the plane of relative movement of the tool support and work support and having the supporting arms thereof extending substantially perpendicular to said plane of relative movement of the tool support and work support, and means for imparting simultaneous identical vibratory movements to said levers.

4. For use in a machine tool having a work support, and a tool support arranged for relative movement, a honing attachment arranged to be supported on the tool support comprising a vibratory honing device including a honing element, a spindle on which the honing element is carried arranged substantially perpendicular to the surface of the work at the point of honing contact, a spindle support, spring means for yieldably supporting the spindle in an extended position in its support, stop means adjustable to vary the extending movement of the spindle in its support and thereby the pressure exerted by the spring means, supporting and actuating means for imparting vibratory movements to said spindle support bodily in the line of honing contact with the work, and a housing for said honing device movable on the tool support between work engaging and inoperative positions.

5. For use in a machine tool having a work support, a tool support, and means for effecting relative movement of said supports, a honing attachment arranged to be supported on the tool support comprising a vibratory honing device including a honing element, a spindle on which the honing element is carried arranged substantially perpendicular to the work surface at the point of honing contact, a spindle support, spring means yieldably supporting the spindle in an extended position in its support, stop means adjustable to vary the extending movement of the spindle and thereby the pressure exerted by the spring means, supporting and actuating means for imparting vibratory movements to the spindle support bodily substantially in the line of honing contact with the work, a housing for said honing device movable with relation to the tool support, shifting means for moving the housing and honing device between predetermined work engaging and inoperative positions, and adjusting means for determining the extent of movement of the housing to work engaging position.

6. For use in a machine tool having a work support and a tool support, and means for effecting relative movement of said supports, a honing attachment comprising a housing, a vibratory honing element, and actuating means therefor carried by the housing, shifting means for moving the housing between work engaging and inoperative positions on the tool support comprising a rack on one of said housing and tool support, and a cooperating pinion and actuating lever therefor carried by the other of said housing and tool support, means for limiting the movement of the lever and rack actuated thereby between two alternative work engaging and inoperative positions, and means for adjusting the position of one of said rack and pinion with relation to its support whereby to effect an adjustment of the work engaging position to which the housing and honing element are moved by said lever.

7. For use in a machine tool having a work support, a tool support, and means for effecting relative movement of said supports, a honing attachment on the tool support comprising a housing, a vibratory honing element, and actuating means therefor carried by the housing, and shifting means for moving the housing and vibratory honing element between work engaging and raised inoperative positions on the tool support comprising a rack on the housing, a pinion carried by the tool support, a manually operable lever connected with the pinion movable between limiting work engaging and inoperative positions, and adjusting means for moving the rack with relation to the housing to adjustably determine the limiting positions to which the housing and honing element are moved by the lever.

8. For use in a machine tool having a work support, a tool support, and means for effecting relative movement of said supports, a honing attachment comprising a housing, a vibratory honing element, and actuating means therefor carried by the housing, and shifting means for moving the housing and vibratory honing element between work engaging and inoperative positions on the tool support comprising a rack slidably supported on the housing, an adjusting screw for determining the position of the rack with relation to the housing, a cooperating pinion carried by the tool support, a manually operable lever connected to rotate the pinion movable between two limiting positions, a stop carried by the tool support for engagement with the rack to limit movement of the rack and lever in work engaging position, and a latching device associated with the lever for locking the lever and rack in inoperative position.

9. For use in a machine tool having a work support, a tool support, and means for effecting relative movement of said supports, a honing attachment comprising a housing, a vibratory honing element and actuating means therefor including an electric motor carried by the housing, shifting means for moving the housing between work engaging and inoperative positions on the tool support comprising a rack on the housing, a pinion carried by the tool support, a manually operable lever connected with the pinion movable between limiting work engaging and inoperative positions, adjusting means for moving the rack with relation to the housing to adjustably determine the limiting positions to which the housing and honing element are moved by the lever, a start and stop switch connection for the motor, and an actuating element for said switch arranged to be actuated by the rack upon movement to work engaging position to start the motor, and by movement of the rack away from said work engaging position to stop the motor.

BENJAMIN P. GRAVES.
HANS CARL WEIMAR.